UNITED STATES PATENT OFFICE.

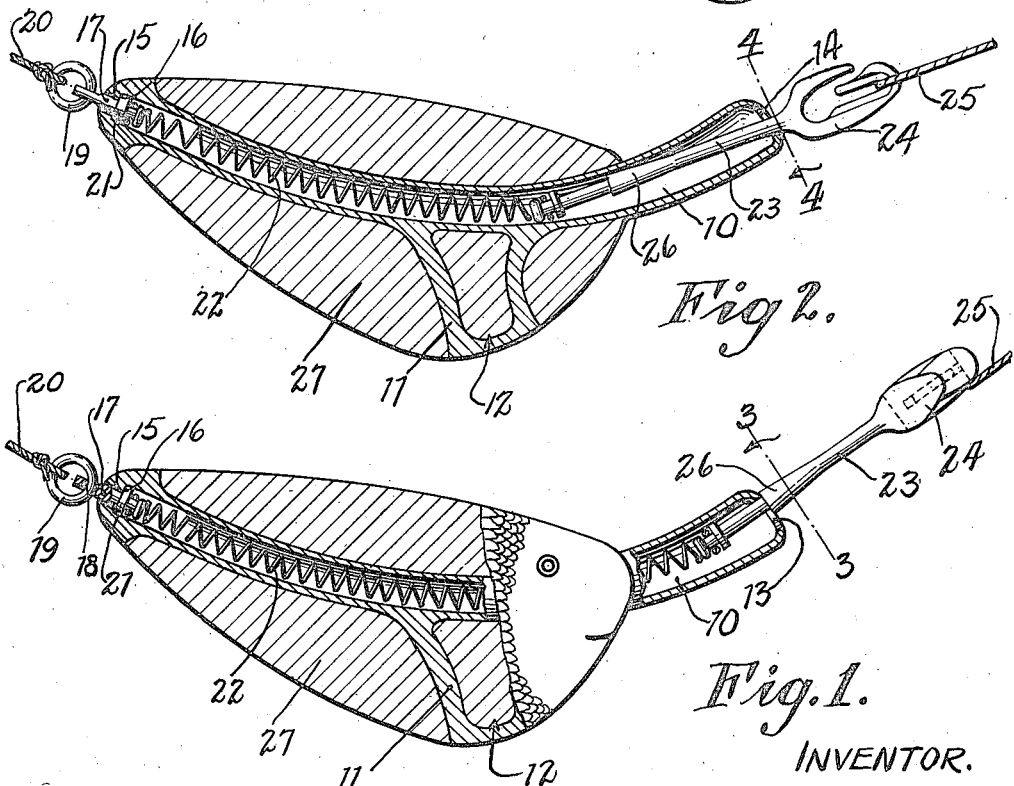

RUEL DINGWELL, OF CAMBRIDGE, MASSACHUSETTS, ASSIGNOR OF ONE-HALF TO F. W. JONES, OF BOSTON, MASSACHUSETTS, AND ONE-HALF TO H. S. ANDREAS, OF ROCHESTER, NEW YORK.

FISHING-TACKLE.

1,295,448.   Specification of Letters Patent.   Patented Feb. 25, 1919.

Application filed August 9, 1918. Serial No. 249,097.

*To all whom it may concern:*

Be it known that I, RUEL DINGWELL, a citizen of the United States, residing at Cambridge, in the county of Middlesex, State of Massachusetts, have invented certain new and useful Improvements in Fishing-Tackle; and I do hereby declare the following to be a full, clear, and exact description of the invention, such as will enable others skilled in the art to which it appertains to make and use the same.

This invention relates to fishing tackle and particularly to a device for connecting the line and snood.

The object of the invention resides in the provision of a device of the character named which will serve as a fish lure, hook the fish automatically, and prevent the fish from tearing the hook out while being pulled in.

A further object of the invention resides in the provision of a device of the type named embodying an improved construction for detachably securing the hook snood thereto which will enable the fish to be readily disengaged from the device without first removing the hook.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a longitudinal section of the invention showing the adjacent portions of the line and snood attached, the parts of the device being in set position;

Fig. 2, a view similar to Fig. 1 with the parts in released position;

Fig. 3, a section on the line 3—3 of Fig. 1, and

Fig. 4, a section on the line 4—4 of Fig. 2.

Referring to the drawings the invention is shown as comprising a curved tube 10 preferably of brass and provided with a lateral extension 11 having an opening 12 therein. The bore of the tube 10 at one end is reduced as at 13 and this reduced portion of the bore is provided with a further reduced lateral extension 14 so as to form an opening having substantially the shape of a key hole. The end of the tube 10 remote from the reduced bore 13 is provided with a reduced bore section 15 forming a shoulder 16. Extending through the reduced bore 15 is the stem 17 of an eye member 18 in which latter is engaged a securing ring 19 having attached thereto one end of a fishing line 20. The stem 17 is provided with a circumscribing flange 21 which bears against the shoulder 16 and prevents disengagement of the eye member from the tube 10. Secured to the inner end of the stem 15 is one end of a spring 22 and the other end of this spring is secured to the inner end of a rod 23 of a diameter sufficiently restricted to permit the rod to enter the reduced portion 14. The rod 23 has formed on its outer end a socket 24 to which is adapted to be detachably secured a snood 25. The rod 23 is provided with a circumscribing enlarged portion 26 adapted to engage the adjacent end of the tube 10 when the rod is disposed in the portion 14 to tension the spring 22 as clearly shown in Fig. 1.

A body 27, preferably of lead, is molded upon the tube 10 and about the extension 11. This body is shaped to simulate a fish with its head portion directed toward the snood 25 so as to represent a fish in position to approach the bait which is carried by the hook attached to the snood 25 and thus encourage other fish to approach the bait. When the bait is taken by a fish the pull on the snood 25 will disengage the rod 23 from the portion 14 when the springs 22 will act automatically to draw the rod 23 into the tube 10 and thus hook the fish.

What is claimed is:—

A line and snood connection for fishing tackle comprising a tubular body having substantially the shape of a fish, an eye member secured in the bore of the body at the end thereof remote from the head of the simulated fish, a spring in the bore of the body having one end attached to said eye member, a rod movable in the bore of the body and having its inner end secured to said spring and its outer end socketed to detachably receive and hold a snood knot, and a circumscribing enlargement on said rod detachably engageable with the outer end of the tubular body to secure the spring in tension.

In testimony whereof I affix my signature in the presence of two witnesses.

RUEL DINGWELL.

Witnesses:
 FRANK W. HOLMES,
 FRANCIS O. HOLMES.